2,750,373
Patented June 12, 1956

2,750,373
ARALKANOYL AND ARALKENOYL DERIVATIVES OF PODOCARPIC ACID ESTERS

Roy H. Bible, Jr., Morton Grove, Ill., assignor, by mesne assignments, to G. D. Searle & Co., Skokie, Ill., a corporation of Delaware No Drawing. Application October 4, 1954,
Serial No. 460,263

10 Claims. (Cl. 260—103)

This invention relates to a new class of derivatives of resin acids. Specifically, it is concerned with alkyl O-alkyl-7-acylpodocarpates which are substituted by an aromatic radical on the carbon atom of the acyl group which is in the β-position to the carbonyl group. The compounds which comprise this invention may be represented by the following general structural formula

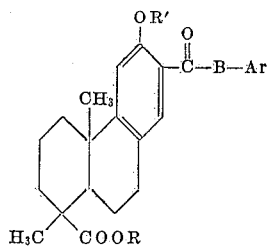

In this formula R and R' represent straight or branched-chain alkyl radicals containing up to 6 carbon atoms. In the preferred embodiments of this invention R and R' are both methyl groups because the derivatives so constituted are prepared with greater ease and in better yield. The grouping B is a bivalent hydrocarbon radical containing from 2 to 6 carbon atoms and separating the carbonyl and aryl groups by two carbon atoms. When the grouping B contains only single bonds it represents such bivalent hydrocarbon radicals as ethylene (—CH₂CH₂—), propylene(CH₃CHCH₂—), 1,2-butylene(CH₃CH₂CHCH₂—)

1,2-amylene(CH₃CH₂CH₂CHCH₂—)

and 1,2-hexylene(CH₃CH₂CH₂CH₂CHCH₂—)

all of which serve to insert two carbon atoms between the carbonyl and aryl groups but does not represent such radicals as trimethylene (—CH₂CH₂CH₂—) and ethylidene (CH₃CH<) which serve to separate the said adjacent groups by other than two carbon atoms. The grouping B also represents bivalent hydrocarbon radicals containing an olefinic bond such as vinylene (—CH=CH—), methylvinylene(CH₃C=CH—), ethylvinylene(CH₃CH₂C=CH—)

propylvinylene(CH₃CH₂CH₂C=CH—)

and butylvinylene(CH₃CH₂CH₂CH₂C=CH—)

The grouping Ar is a monocyclic or bicyclic aromatic radical. When Ar is a hydrocarbon radical it represents phenyl, naphthyl and lower alkyl derivatives thereof. Some enhancement of the utility of the compounds of this invention is observed when the Ar grouping is modified in such a manner that one or more ether linkages are present, for example when it is further substituted by one or more lower alkoxy groups. In these instances the grouping Ar represents such aromatic radicals as p-methoxyphenyl and 2,3-dimethoxyphenyl. The grouping Ar may also represent an aromatic radical containing a heterocyclic atom, such as furyl. It will be noted that the furyl group is a heterocyclic system having aromatic properties, and is also a special type of ether in which the ethereal oxygen atom is part of a ring.

In preparing those compounds of the present invention which contain an olefinic bond in the bivalent hydrocarbon radical B, one employs as starting material an alkyl O-alkyl-7-acylpodocarpate, such as methyl O-methyl-7-acetylpodocarpate, and condenses it with the desired aromatic aldehyde in the presence of a basic catalyst such as an alkali metal hydroxide. In the course of the reaction the methylene group which is adjacent to the ketonic carbonyl group of the resin acid derivative condenses with the aldehyde group, and spontaneous dehydration occurs to introduce a conjugated double bond. This double bond is susceptible to preferential catalytic hydrogenation and can be selectively reduced by contact with a hydrogen atmosphere in the presence of a noble metal catalyst such as palladium on charcoal.

A particular utility of the compounds which constitute this invention is that they possess certain of the physiological properties of the naturally occurring adrenocortical hormones, without displaying the manifold range of activities that has limited the usefulness of the natural hormones. Specifically, they have been found to inhibit the hyperemia that is associated with certain states of inflammation of the iris. The compounds of this invention are also useful in chemical synthesis. For example, those of the compounds which have an olefinic bond in the bivalent hydrocarbon radical B may be converted by means of an ozonization process and decomposition of the ozonide into methyl O-methyl-7-carboxypodocarpate, as disclosed more fully in the examples to follow.

These examples are set forth by way of illustration only and it will be understood that the invention is not to be construed as limited in spirit or in scope by the details contained therein, as it will be apparent to those skilled in the art that many modifications in materials and methods can be made without departing from the scope of the invention. In these examples temperatures are given in degrees centigrade, quantities of materials in parts by weight and pressures in millimeters (mm.) of mercury. Specific rotations are determined in 1% ethanolic solution at 25° C.

Example 1

A general procedure for preparing arylidene derivatives of methyl O-methyl-7-acetylpodocarpate is as follows: A mixture of 2 parts of an aromatic aldehyde, 2 parts of methyl O-methyl-7-acetylpodocarpate, 5 parts of potassium hydroxide and 75 parts of methanol is heated under reflux for about 5 minutes and then allowed to cool and stand at room temperature for from 12 to 24 hours. In some instances the arylidene derivative crystallizes from the reaction mixture and is obtained by collecting it on a filter. In those instances in which spontaneous crystallization of the reaction product does not occur, the mixture is diluted with about 500 parts of water and extracted with ether. The ethereal extract is washed with water, dried over anhydrous sodium sulfate, filtered and evaporated. A residue consisting of the crude arylidene derivative is obtained in this manner. The compounds prepared by this procedure can be illustrated by the type formula

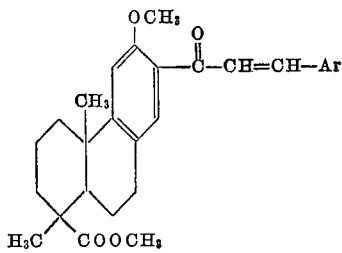

wherein Ar is an aromatic radical of either the carbocyclic or heterocyclic type.

*Example 2*

By the method of Example 1, using benzaldehyde as the aromatic aldehyde, the benzylidene derivative (Ar= phenyl) is obtained. It is purified by distillation at reduced pressure. The compound distills at a temperature of 230° C. at about 0.04 mm. pressure. The specific rotation of the purified material is +122°. Ultraviolet absorption maxima are observed at 224 and 303 millimicrons. Infrared absorption maxima are observed at 5.82, 6.04, 7.12, 10.25 and 12.93 microns.

*Example 3*

By the method of Example 1, using p-methoxy-benzaldehyde as the aromatic aldehyde, the p-methoxy-benzylidene derivative (Ar=p-methoxyphenyl) is obtained as rectangular plates, melting point 132–134° C. after recrystallization from aqueous methanol. The specific rotation is +114°. Ultraviolet absorption maxima are observed at 227 and 337 millimicrons. Infrared absorption maxima appear at 5.82, 6.04, 7.12, 10.12, and 11.99 microns.

*Example 4*

By the method of Example 1, using 2,3-dimethoxybenzaldehyde as the aromatic aldehyde, the 2,3-dimethoxybenzylidene derivative (Ar=2,3-dimethoxyphenyl) is obtained. By recrystallization from aqueous methanol it forms small plates melting at 153.5–156° C. and exhibiting a specific rotation of +106°. An ultraviolet absorption maximum is observed at 308 millimicrons. Infrared absorption maxima appear at 5.82, 6.04, 7.12, 9.97, and 12.60 microns.

*Example 5*

By the method of Example 1, using α-naphthaldehyde as the aromatic aldehyde, the α-naphthylmethylene derivative (Ar=α-naphthyl) is obtained. When purified by distillation at about 250° C. at 0.1 mm. pressure, it has a specific rotation of +105° and ultraviolet absorption maxima at 260 and 350 millimicrons. Infrared absorption maxima are found at 5.82, 6.04, 7.12, 10.25, and 12.50 microns.

*Example 6*

By the method of Example 1, using furfuraldehyde as the aromatic aldehyde, the furfurylidene derivative (Ar= α-furyl) is obtained. It is purified by distillation at about 0.04 mm. pressure in a short-path apparatus. In this manner it is isolated as a high-boiling, light yellow glass. The ultraviolet absorption spectrum has maxima at 251 (broad) and 335 millimicrons.

*Example 7*

A mixture of the p-methoxybenzylidene derivative of Example 3, alternatively named as methyl O-methyl-7-(p-methoxycinnamoyl)-podocarpate (2.52 parts), 1.02 parts of 5% palladium on charcoal catalyst and 70 parts of ethyl acetate is shaken in a hydrogen atmosphere at a pressure of 40 pounds per square inch for 4 hours. The catalyst is then filtered from the reaction mixture and the solvent is removed by evaporation of the filtrate.

The residue which remains is distilled in a short-path distillation apparatus, preferably at a pressure of less than 0.1 mm. The methyl O-methyl-7-[β-(p-methoxyphenyl)-propionyl]-podocarpate is obtained as a light yellow glass having a specific rotation of +100° and ultraviolet absorption maxima at 257 and 315 millimicrons. Infrared absorption maxima are observed at 5.81 and 6.00 microns. This compound has the structural formula

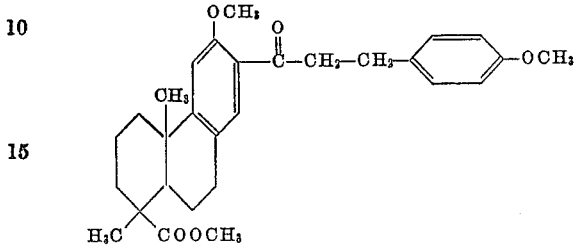

*Example 8*

A solution of 5 parts of methyl O-methyl-7-(p-methoxycinnamoyl)-podocarpate, 40 parts of methylene chloride and 12 parts of methanol is chilled in a solid carbon dioxide bath and a mixture of ozone and oxygen is passed into this solution until one equivalent of ozone has been absorbed. The reaction mixture is subjected to a steam distillation and the organic residue is dissolved by extraction with ether. The ethereal solution is then extracted with dilute sodium bicarbonate. When the bicarbonate solution is acidified, methyl O-methyl-7-carboxypodocarpate precipitates. When this compound is purified by repeated recrystallization from aqueous methanol, colorless needles, melting point 168–169.5° C., are obtained. The compound can also be purified by sublimation at 0.1 mm. pressure. This material shows a specific rotation of +134° and ultraviolet absorption maxima at 242 and 302 millimicrons. Infrared maxima are observed at 3.05 and 5.85 microns.

*Example 9*

A solution of 19.6 parts of propionyl chloride in 144 parts of s.-tetrachloroethane is added slowly, with stirring, to a mixture of 30.2 parts of methyl O-methylpodocarpate, 27.2 parts of aluminum chloride and 400 parts of s.-tetrachloroethane maintained at about 4–6° C. After the addition is complete, the reaction mixture is stirred for an additional hour at about 4–8° C. and then allowed to stand for 8 days at about 6° C. and then for 14 days at room temperature. The mixture is then stirred with ice and hydrochloric acid, after which the organic layer is separated and washed with dilute hydrochloric acid and then with several portions of water. The organic layer is dried, filtered and evaporated until the volatile solvent is removed. When the residual material is distilled in a short-path apparatus, the crude propionyl derivative is obtained as a light yellow glass boiling at 204–214° C. at about 0.2 mm. pressure. By repeated recrystallization of this material from aqueous methanol, there is obtained a solid melting over a fairly wide range, from about 78–100° C. Infrared analysis and methoxyl determination demonstrate that some demethylated material is present as a contaminant in the product of this degree of purity. By chromatography on a silica gel column, there is obtained the pure methyl O-methyl-7-propionylpodocarpate having ultraviolet absorption maxima at 256 and 320 millimicrons and infrared absorption maxima at 5.80, 5.98, and 6.23 microns.

*Example 10*

A mixture of 1 part of methyl O-methyl-7-propionyl-podocarpate, 1 part of benzaldehyde, 3 parts of potassium hydroxide and 40 parts of methanol is heated under reflux for about 5 minutes and then allowed to stand at room temperature for about 20 hours. The reaction mixture is then diluted with about 300 parts of water and extracted with ether. The ethereal extract is washed with water, dried over anhydrous sodium sulfate, filtered and evaporated, yielding a residue of the crude benzylidene derivative. This material is purified by distillation in a short-path apparatus at about 0.04 mm. pressure. In this manner there is obtained methyl O-methyl-7-(α-methyl-β-phenylacryloyl)-podocarpate as a yellow glass. This compound has the following structural formula

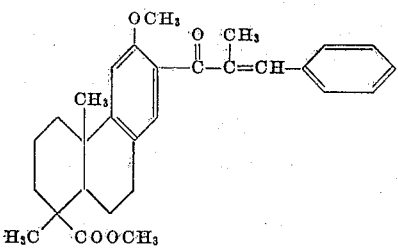

*Example 11*

A mixture of 2.0 parts of methyl O-methyl-7-(α-methyl-β-phenylacryloyl)-podocarpate, 1.0 part of 5% palladium on charcoal catalyst and 55 parts of ethyl acetate is shaken in a hydrogen atmosphere at a pressure of about 40 pounds per square inch for 4 hours. The reaction mixture is filtered and the filtrate is evaporated until the volatile solvent is removed. The residual material is distilled in a short-path-distillation apparatus at a pressure of about 0.1 mm. The methyl O-methyl-7-(α-methyl-β-phenylpropionyl)-podocarpate is obtained as a high-boiling, very viscous, yellow distillate. This compound has the structural formula

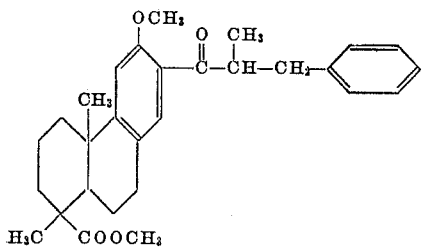

*Example 12*

A solution of 12.8 parts of caproyl chloride in 100 parts of s.-tetrachloroethane is added slowly, with stirring, to a mixture of 13.6 parts of methyl O-methylpodocarpate, 12.2 parts of aluminum chloride and 200 parts of s.-tetrachloroethane maintained at about 4–6° C. When the addition has been completed, the reaction mixture is stirred for an additional hour at about 4–8° C. and then allowed to stand for 100 hours at about 6° C. and then for 48 hours at room temperature. The mixture is then poured into ice and hydrochloric acid and stirred until all of the ice has melted. The organic layer is separated and washed with dilute hydrochloric acid and then with several portions of water. The organic layer is dried, filtered and evaporated until the volatile solvent is removed. When the residual material is distilled at about 0.1 mm. pressure in a short-path apparatus the crude methyl O-methyl-7-caproylpodocarpate is obtained as a light yellow, high-boiling distillate.

*Example 13*

A mixture of 1 part of methyl O-methyl-7-caproylpodocarpate, 1 part of benzaldehyde, 3 parts of potassium hydroxide and 75 parts of methanol is heated under reflux for about 5 minutes and then allowed to stand at room temperature for about 20 hours. The reaction mixture is then diluted with about 400 parts of water and extracted with ether. The ethereal extract is washed with water, dried over anhydrous sodium sulfate, filtered and evaporated, yielding a residue of the crude benzylidene derivative. When this material is purified by distillation in a short-path apparatus at about 0.1 mm. pressure, methyl O-methyl-7-(α-butyl-β-phenylacryloyl)-podocarpate is obtained as a viscous yellow distillate. This compound has the following structural formula

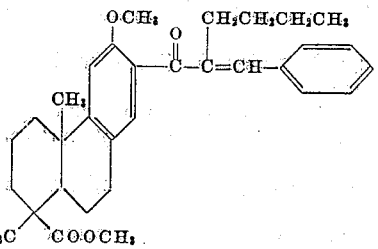

I claim:

1. A compound having the structural formula

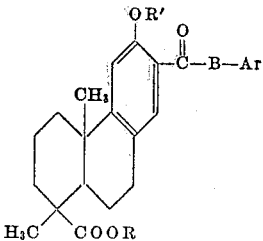

wherein B is a bivalent hydrocarbon radical containing from 2 to 6 carbon atoms and separating the

and —Ar groups by two carbon atoms, R and R' are lower alkyl radicals, and Ar is a member of the group consisting of aryl hydrocarbon radicals containing from 6 to 10 cyclic carbon atoms, (lower)alkoxy-substituted derivatives thereof, and furyl.

2. A compound having the structural formula

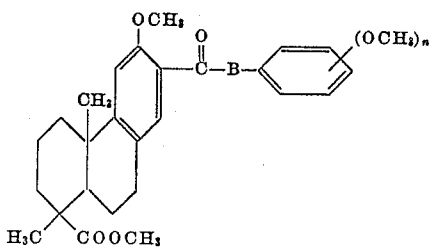

wherein B is a bivalent hydrocarbon radical containing from 2 to 6 carbon atoms and separating the oxo and methoxylated phenyl groups attached thereto by two carbon atoms, and n is a positive integer less than 3.

3. A compound having the structural formula

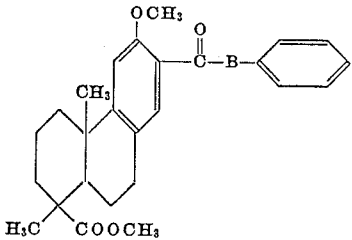

wherein B is a bivalent hydrocarbon radical containing from 2 to 6 carbon atoms and separating the oxo and phenyl groups attached thereto by two carbon atoms.

4. A compound having the structural formula

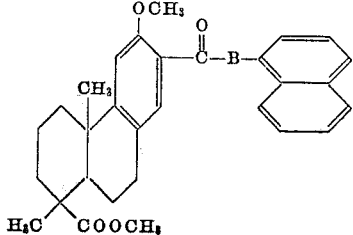

wherein B is a bivalent hydrocarbon radical containing from 2 to 6 carbon atoms and separating the oxo and α-naphthyl groups attached thereto by two carbon atoms.

5. Methyl O-methyl-7-(p-methoxycinnamoyl)-podocarpate.

6. Methyl O-methyl-7-(2',3'-dimethoxycinnamoyl)-podocarpate.

7. Methyl O-methyl-7-cinnamoylpodocarpate.

8. Methyl O-methyl-7-[β-(α-naphthyl)-acryloyl]-podocarpate.

9. Methyl O-methyl-7-[β-(p-methoxyphenyl)-propionyl]-podocarpate.

10. The process for preparing a compound having the structural formula

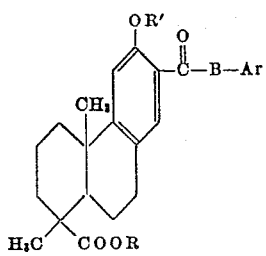

wherein B is a bivalent hydrocarbon radical containing from 2 to 6 carbon atoms and separating the $$-\overset{O}{\underset{\|}{C}}-$$

and —Ar groups by two carbon atoms, R and R' are lower alkyl radicals, and Ar is a member of the group consisting of aryl hydrocarbon radicals containing from 6 to 10 cyclic carbon atoms, (lower)alkoxy-substituted derivatives thereof, and furyl, which comprises bringing into contact in an alcoholic solvent an alkyl O-alkyl-7-acylpodocarpate, an aromatic aldehyde having the formula Ar—CHO wherein Ar is defined as hereinabove and an alkali metal hydroxide.

References Cited in the file of this patent

JACS, vol. 64, pp. 928–35 (1942).

Elsevier's Encyclopedia of Org. Chem., vol. 13, page 978.

Chem. Abst., vol. 42, col. 8184f (1948), citing Nature, vol. 161, page 892 (1948).